United States Patent [19]

Rosner

[11] Patent Number: 5,228,529
[45] Date of Patent: Jul. 20, 1993

[54] METHOD FOR RENEWING FUEL CELLS USING MAGNESIUM ANODES

[76] Inventor: Stuart Rosner, 285 Stegman Pkwy., Jersey City, N.J. 07305

[21] Appl. No.: 809,303

[22] Filed: Dec. 17, 1991

[51] Int. Cl.$^5$ .............................................. B60K 1/00
[52] U.S. Cl. .................... 180/65.3; 180/165; 429/49; 423/657
[58] Field of Search .............. 180/65.1, 65.2, 65.3, 180/165; 429/27, 29, 49; 423/657; 60/39.02, 39.12

[56] References Cited

U.S. PATENT DOCUMENTS

| | | | |
|---|---|---|---|
| 3,830,662 | 8/1974 | Kinsey | 429/49 |
| 4,413,040 | 11/1983 | Carr | 429/49 |
| 4,841,731 | 6/1989 | Tindell | 60/39.12 |
| 4,950,561 | 8/1990 | Niksa et al. | 429/27 |
| 5,135,817 | 8/1992 | Shimogori et al. | 423/657 |

Primary Examiner—Richard M. Camby
Attorney, Agent, or Firm—Weingram & Zall

[57] ABSTRACT

Renewable fuel cells that produce hydrogen gas, on demand, are used to power a vehicle. When the usable volume of hydrogen gas produced by the fuel cells is depleted, the magnesium anode is converted into magnesium hydroxide precipitate. The magnesium hydroxide precipitate is removed and collected for recycling and the magnesium anode and salt water electrolyte is replaced, thus easily and conveniently re-energizing the fuel cell. The magnesium hydroxide precipitate is recycled to recapture the magnesium which is then formed into new magnesium anodes. The primary power source for the recycling is derived from solar energy. The only waste product produced by the operation of the fuel cell is non-polluting water.

8 Claims, 4 Drawing Sheets

METHOD FOR RENEWING FUEL CELLS USING MAGNESIUM ANODES

BACKGROUND OF THE INVENTION

1. Field of the Invention

The present invention relates to a method for using a plurality of renewable fuel cells (hydrogen gas generators) to propel a vehicle, and re-energizing these fuel cells by replacing their depleted anodes with new anodes manufactured from materials recovered and recycled from the depleted fuel cells. This method incorporates the use of solar energy to provide the primary recycling energy requirements and also to provide a non-polluting, economic method of recycling.

2. Description of the Prior Art

The present invention comprises a process wherein certain conventional apparatus or known process steps are used in a unique combination to achieve the objectives of this invention. The prior art neither teaches nor suggests the methods, i.e. combination of steps, of the present invention.

Prior art which may be relevant to a particular process of this invention is described hereinafter.

U.S. Pat. No. 2,925,455, to Eldensohn, discloses a continuous-feed two-stage primary battery system. In the first stage, an electrochemical reaction of an active metal with water continuously generates electrical energy and simultaneously generates a gas used as a reactant in a second stage to produce additional electrical energy.

U.S. Pat. No. 3,036,141, to Goldenberg, discloses a magnesium galvanic cell comprising a magnesium or magnesium alloy anode, an aqueous electrolyte, and an inert cathode.

U.S. Pat. No. 3,036,142, to Goldenberg, discloses an improved magnesium galvanic cell in which magnesium reacts with water to produce magnesium hydroxide, hydrogen gas and electricity.

U.S. Pat. No. 3,043,898, to Miller, et al., discloses a gas depolarized battery comprised of a number of gaseous depolarized, metal primary cells cemented together in a series and provided with tension means to compress the cells as the metallic anodes are consumed. This compression maintains the distance between the electrode surfaces constant and thus maintains a constant voltage output.

U.S. Pat. No. 3,218,195, to Corren, discloses methods and apparatus for producing electricity intermittently upon demand, or continuously in a galvanic cell by a chemical reaction effected at the electrodes.

U.S. Pat. No. 3,238,070, to Porter II, discloses a secondary battery comprising a circulating electrolyte and a plurality of individual cells arranged to form this battery. The cells are formed of a zinc-oxygen electrochemical couple.

U.S. Pat. No. 3,247,042, to Tamminen, discloses a galvanic battery capable of delivering large currents without appreciable voltage declines for prolonged periods. This patent teaches that circulation of the electrolyte increases the use of a depolarizing substance and reduces the internal resistance of the battery and thus decreases the inherent voltage drop during discharge.

U.S. Pat. No. 3,256,504, to Fidelman, discloses the production of hydrogen by reacting magnesium with water, the reaction being accomplished by galvanically coupling magnesium with an active inert metal in saline water.

U.S. Pat. No. 3,542,598, to White, et al., discloses a sea water battery with an electrolyte recirculation circuit which requires no auxiliary energy source for operation. This invention also maximizes the utilization of the plates during operation of the battery.

U.S. Pat. No. 3,892,653, to Pacheco discloses a galvanic hydrogen generator that uses a magnesium electrode in a salt water solution to produce hydrogen gas both by electrochemical reaction and by electrolysis. Hydrogen gas is produced when an electrical load is connected between the electrodes. The resulting current flow is produced by an electrochemical reaction in which a magnesium electrode is decomposed to produce hydrogen gas. This current flow also decomposes water contained in the electrolytic solution to produce hydrogen gas.

U.S. Pat. No. 3,943,719 to Terry et al. discloses a power system comprising a reactor in which a hydride absorbs hydrogen at low pressure and low temperature, and then heating the hydride at constant volume so as to release large quantities of hydrogen at high temperatures and pressure. This released hydrogen is used to produce power and yield refrigeration. Electrical power can be generated by expanding the released hydrogen through a turbine or other power producing devices.

U.S. Pat. No. 4,055,962 to Terry discloses a hydrogen-hydride absorption system comprising a sequential method of reversibly combining hydrogen with a hydride-forming material, heating the hydride at constant volume, and means for conveying hydrogen between the reactors. In the power or heat pump cycle, the hydride in a first reactor is heated to desorb hydrogen gas. The gas flows to a second hydride bed in a second reactor where it is absorbed at a temperature lower then the temperature of desorption of the first hydride bed. Absorption of the hydrogen by the second reactor releases the heat of absorption. This heat of absorption is typically removed by a heat exchanger. In the heat pump mode of operation, the above cycle is sequentially repeated through a series of reactors so that the heat of absorption is sequentially added to the heat exchange fluid.

In conjunction with the above, a plurality of reactors are operated in a refrigeration mode of operation and in such a manner that the reactors of the heat pump cycle are in a phase compatible with an opposing reactor of the refrigeration system.

U.S. Pat. No. 4,090,361 to Terry et al., discloses improved-power cycles for using the hydride-dehydride-hydrogen (HDH) power cycle to produce hydrogen gas continuously at high pressure and elevated temperatures. This gas can be used to produce power and refrigeration. The hydrogen gas can be passed directly to an expansion device, such as a turbine, or the hydrogen gas can be the working fluid used to transfer heat to a secondary system. Terry discloses using the HDH cycle to continuously produce hydrogen gas to drive an expansion device such as a turbine.

K. K. Kelley, Energy Requirements And Equilibria And The Dehydration, Hydrolysis And Decomposition Of Magnesium Chloride, Technical Paper 676, U.S. Department of the Interior, 1945, discloses the dehydration reaction and hydrolysis of magnesium chloride.

Magnesium and Magnesium Alloys, The International Magnesium Association, *Kirk-Othmer Encyclope-*

*dia of Chemical Technology*, Volume 14, discloses various commercial processes for producing magnesium.

The Chemical Process Industries, 2nd Edition, Shreve, 1956 pp 223-227, 319-323, discloses various commercial methods for producing magnesium.

Warming Trend, Cook, Forbes, Feb. 20, 1989, pp. 68-69 discloses solar energy system applications.

, . . . The Optics of Non-Imaging Concentrators, Light and Solar Energy, Welford et al. (1978), discloses solar energy concentration applications, considerations and power yields.

Sun Master Corporation sales brochure, solar-thermal energy collector, discloses a commercial solar concentrator based upon a compound parabolic concentrator reflector.

Small Community Experiment #1, Ossage City, Kans., Barber, Proceedings of the Distributed Receiver Solar Thermal Technology Conference, Apr. 24-25(1985) pp. 13-20, discloses the experience gained from a one hundred KW electric solar plant using a solar concentrator.

Automobiles, New Age EVs, Shuldiner, Popular Mechanics, September 1991, pp. 27-29, discloses possible oil savings and environmental considerations in using all electric or hybrid electric vehicles.

Battery Chargers, Allen. Popular Mechanics, September 1991 (pp. 30-31, 102), discloses the use of electric batteries to propel vehicles.

Unique Mobility, Inc., Sales Brochure (1990) discloses commercially available electric propulsion systems with range extenders.

V 160 Stirling Engine Program Update, Johansson et al., SAE Technical Paper Series 880542, International Congress and Exposition, Feb. 29-Mar. 4, 1988, discloses the progress made in developing a vehicular engine that can operate from a multitude of different fuels -liquid, gaseous, or solid.

Kaylor-Kit Electric R 100 MPG Hybrid Car Sales Brochure (1990), discloses a gas-electric replacement unit for an original VW power plant.

EV Engineering Guidebook: Electric Vehicle Conversion for the 1980's, Shipps, 3E Vehicles, pp. 21-25, 49-52, 1981, discloses advantages, methods and problems of converting a vehicle to an electric motor propelled vehicle and/or to a hybrid vehicle that uses both electric motors and a combustion engine to propel the vehicle.

SUMMARY OF THE INVENTION

A principal object of the present invention is to provide a non-polluting energy source for vehicles.

Another object of the present invention is to provide an energy source that can be renewed from solar energy.

Still another object of the present invention is to provide an affordable, cost efficient, power source for vehicles.

A further object of the present invention is to provide an alternative energy source to energy derived from oil products.

A still further object of the present invention is to convert solar energy into a form that is easily storable, transportable, and self contained.

An additional object of the present invention is to provide an environmentally benign power source that does not require elaborate controls or safeguards.

Another object of the present invention is to provide a stored energy source that can be easily and economically renewed.

Still another object of the present invention is to provide a high degree of recycling of the materials and chemicals involved in the process.

A further object of the invention is to provide an energy source for vehicles that is competitive in terms of range and speed with conventional motor vehicles.

A still further object of the present invention is to convert solar energy into the heat and electrical power needed to supply the major energy needs for the renewal process.

Another object of the present invention is to avoid atmospheric pollution resulting from the combustion products of a gasoline powered engine.

The objects of the foregoing invention are achieved by a plurality of fuel cells (hydrogen gas generators), containing a magnesium anode wherein these fuel cells are installed in a vehicle. The fuel cells generate hydrogen gas by galvanic reaction which is controlled by varying the electrical load, i.e., the resistance, connected to the fuel cells. A short circuit (zero resistance) load provides maximum production of hydrogen gas within these fuel cells.

The hydrogen gas produced by the fuel cells (hydrogen gas generators) is vented and collected in a burner mechanism. In one embodiment, the hydrogen gas is mixed in an appropriate ratio with oxygen from the atmosphere and then ignited. The heat energy produced by burning the hydrogen gas is used to increase the temperature of atmospheric air. This hot air drives a turbine/generator set to produce electrical power. The electrical power from the turbine/generator set is stored in storage batteries and/or applied directly to the electric motors that the vehicle.

In another embodiment, the hydrogen gas is used to fuel a Sterling engine. This engine can drive an electrical generator to produce electrical power that is stored in storage batteries and/or applied directly to the electric motors that propel the vehicles.

In still another embodiment, the Sterling engine can mechanically propel the vehicle in a manner similar to a conventional combustion engine.

Burning the hydrogen gas also produces non-polluting water as an emission product.

As hydrogen gas is generated through galvanic action of the fuel cell, a magnesium anode is depleted and magnesium hydroxide precipitate is formed. Eventually no usable volume of hydrogen gas is generated by the fuel cell.

When the volume of hydrogen gas generated reaches or approaches this critical "out-of-gas" level, the operator drives the hydrogen powered vehicle into a service station to have the fuel cells renewed or replaced. Renewal comprises removing the depleted magnesium anode, removing or filtering the old electrolyte solution and removing the magnesium hydroxide precipitate and then re-energizing (renewing) the fuel cell (hydrogen gas generator) by filling it with fresh electrolytic solution (or the filtered electrolytic solution plus water) and installing a new magnesium anode. The magnesium hydroxide precipitate is collected for recycling into new magnesium anodes as described hereinafter.

The magnesium hydroxide precipitate is dried. This dried precipitate is then washed to remove water-soluble impurities. After washing, the washed magnesium hydroxide precipitate is drained but only to the point where a slurry of magnesium hydroxide is formed.

This magnesium hydroxide slurry is combined with hydrochloric acid in a reactor to produce magnesium chloride. Due to the water content from the slurry, the magnesium chloride is in the form of a magnesium chloride brine. This brine is filtered to remove solid impurities and then dried in a heated evaporator or spray dried. Drying the magnesium chloride brine produces magnesium chloride granules.

These magnesium chloride granules are then loaded into a plurality of sealable electrolytic cells and heated to a molten state. Electrical power is then applied to these electrolytic cells to cause the magnesium chloride to disassociate into magnesium and hot chlorine gas.

The magnesium is formed by conventional manufacturing methods into new magnesium anodes to be used to renew depleted fuel cells.

The chlorine gas is recycled into hydrochloric acid as follows. The chlorine gas is mixed with hydrogen gas in a burner or combustion chamber and then ignited. The resulting reaction produces hydrochloric gas which is then bubbled through water to produce hydrochloric acid. This acid is recycled by reacting it with the magnesium hydroxide slurry, previously mentioned, so as to produce the magnesium chloride brine.

The aforementioned process requires significant amounts of energy particularly in the electrolysis of the molten magnesium chloride and in drying the magnesium chloride brine. This energy is ideally and economically obtained from solar energy as described below.

Solar energy is collected by a solar concentrator and used to increase the temperature of a heat transfer fluid circulated past the area of solar concentration. This heated transfer fluid is circulated through the aforementioned evaporator so as to dry the magnesium chloride brine. In addition, in one embodiment, this heated transfer fluid is circulated through a water-filled boiler where the heat transferred converts the water into steam. This steam drives a turbine/generator which, in turn, produces the electrical power for the electrolysis of the molten magnesium chloride in the electrolytic cells.

In another embodiment, a turbine/generator set is driven by hydrogen gas produced by a hydride-dehydride-hydrogen (HDH) cycle. In this embodiment, a plurality of closed and interconnected reactor vessels contain a solid material capable of reacting with hydrogen gas at relatively low temperature and pressure to form hydride compounds. Typically, a plurality of different hydride materials may be used when HDH systems are operated in a phase compatible with an opposing reactor in a heat pump/refrigeration cycle. The equilibrium pressure of the hydrogen gas generated and the temperatures of absorption and desorption will depend upon the specific hydriding characteristics of the hydridable material used and the heat sources available for supplying heat to bring the hydride to the equilibrium temperature and then activating the hydride so as to release hydrogen gas.

Assume that initially the hydridable material is in a cold, deactivated state. Here "cold" means a temperature lower than the temperature required for hydriding; generally ambient temperature or lower. Hydrogen gas is charged into the system at a relatively low pressure and temperature. This hydrogen gas combines chemically with the hydridable material in the reactor in an exothermic reaction. Typically, during charging, the reactors are cooled so that this exothermic reaction does not raise the hydride material above its equilibrium temperature. Production of the hydride continues under controlled temperature until the equilibrium state is reached in which the hydride is saturated with hydrogen at substantially the pressure at which the hydrogen gas was introduced into the reactor and at the equilibrium temperature for the particular hydride.

After charging, the reactor system is sealed.

The charged, sealed reactors are heated by circulating a heated transfer fluid or other heat exchange medium through a heat exchange coil on each reactor. The passage of the heated transfer fluid through the reactor heat exchange coils increases the temperature in the reactor to substantially above the activation temperature. Due to the release of hydrogen gas from the hydride, the pressure of the hydrogen gas in the reactor increases substantially. This phenomena of chemical compression of the hydrogen gas occurs during activation as a result of the constant volume imposed by the closed reactor system.

The compressed hydrogen gas is passed via conventional manifold means to an expansion device such as a turbine of a turbine/generator set. The compressed hydrogen gas expands and drives the turbine. This expansion reduces the pressure of the hydrogen gas and concurrently, reduces its temperature.

The lower pressure and temperature hydrogen gas is recirculated to a reactor to be reabsorbed by the hydriding material and to recommence the HDH cycle.

Pressurized hydrogen continues to be released from the hydride material at a substantially constant pressure while the heat transfer fluid is circulated through the reactor and until substantially all of the hydrogen is chemically disassociated from the hydride and released as hydrogen gas.

After dehydriding is complete, the temperature of the reactor is decreased or allowed to decrease to below the hydride equilibrium temperature. The reactor is now prepared to receive "cold" hydrogen gas such as from the turbine and recommence the HDH cycle.

By using a plurality of reactors, pressurized hydrogen gas can be discharged from one or more reactors while other reactors are recharging. This method renders a substantially continuous supply of pressurized hydrogen to drive a turbine.

By using a HDH system to generate electrical power from solar energy, the solar energy is more efficiently converted to electrical power than when the solar energy is used to produce steam to drive a turbine/generator. In addition, HDH systems can be developed to provide 24 hour production of power based upon solar energy. In this embodiment, a plurality of reactors could be interconnected to sequentially provide pressurized hydrogen gas to drive a turbine/generator while concurrently the waste heat produced by the recharge (refrigeration) cycle or from other processes, such as the heat generated by the magnesium hydroxide with hydrochloric acid reaction, etc., could be recirculated to the hydrogen deabsorbing (heat pump) reactors wherein this waste heat would maintain these reactors above their activation temperatures.

In an alternative embodiment, a portion of the solar energy captured each day could be stored in a heat reservoir and then withdrawn after the sun sets so as to enable extended, nighttime, or 24 hour operation of heat and power generation.

The process of combining magnesium hydroxide slurry with hydrochloric acid to produce magnesium chloride and then obtaining magnesium by the electrolysis of magnesium chloride is modeled on the Dow chemical seawater extraction process for obtaining magnesium, Magnesium and Magnesium Alloys, *Kirk-Othmer Encyclopedia of Chemical Technology*, V 14. P.577-578, incorporated herein by reference. An alternative method is the Norsk Hydro process, Magnesium and Magnesium Alloys, *Kirk-Othmer Encyclopedia of Chemical Technology*, V 14. p. 578-580, incorporated herein by reference, wherein the magnesium hydroxide is calcined to magnesium oxide, mixed with carbon and magnesium chloride, and formed into pellets. These pellets are dried and fed into the top of an electrically heated furnace. Chlorine gas is pumped into the bottom of the furnace. The reactions involved are:

$$MgO + C + Cl_2 \rightarrow MgCl_2 + CO$$

$$MgO + CO + Cl_2 \rightarrow MgCl_2 + CO_2$$

These exothermic reactions, once started, basically sustain themselves. Molten magnesium chloride is fed into electrolytic cells where magnesium and chlorine gas are produce by electrolysis.

Another alternative method is based on the Natural Lead Industries brine process for obtaining magnesium, Magnesium and Magnesium Alloys, *Kirk-Othmer Encyclopedia of Chemical Technology*, V 14, p. 580-581, incorporated herein by reference. Applying this process, the magnesium hydroxide is concentrated into a brine and treated with calcium chloride to obtain magnesium chloride brine. This brine is further concentrated and then spray dried. Spray drying the brine produces a dry magnesium chloride powder which is heated to a molten state and fed to an electrolytic cell. Magnesium and chlorine gas are then produced by electrolysis of the molten magnesium chloride.

Still another alternative method is based on the American Magnesium brine process for obtaining magnesium, Magnesium and Magnesium Alloys, *Kirk-Othmer Encyclopedia of Chemical Technology*, V 14, p. 581-582, incorporated herein by reference. Applying this process, the magnesium hydroxide from the fuel cell is first treated with hydrochloric acid or calcium carbide to obtain magnesium chloride brine. This brine is then concentrated, purified, and spray dried. The resulting dry magnesium chloride powder is electrolyzed at greater than 150 kA in modified, diaphragmless (USSR type) cells. This method achieves better than 80% current efficiency with a DC power consumption of about 15.4 kw-hr per kg of magnesium produced. A vacuum ladle is used to remove the molten magnesium. The USSR diaphragmless-type electrolyte cells provide for simplified magnesium metal and chlorine gas collection because their anode and cathode spaces form a common working unit.

Other processes for reclaiming magnesium from magnesium hydroxide could be readily incorporated into the process of this invention.

BRIEF DESCRIPTION OF THE DRAWINGS

These as well as further objects and advantages of the present invention will become apparent to those skilled in the art from a review of the following detailed specification, reference being made to the accompanying drawings in which.

DETAILED DESCRIPTION

The method of this invention defines a two stage process whereby in the first stage, magnesium anode fuel cells (hydrogen generators) are depleted by powering an electric vehicle. In another embodiment, the hydrogen gas generated by these fuel cells fuel a combustion engine, such as a Sterling Engine, which mechanically propels a vehicle. An alternative to this embodiment, is to drive a generator from the combustion engine. This generator then provides the electrical power to propel the vehicle. In the second stage, the fuel cells are re-energized (renewed) by removing the depleted materials, i.e., the magnesium hydroxide precipitate, depleted magnesium anode and electrolyte, recycling the magnesium hydroxide precipitate to produce new magnesium anodes, and then installing these new (or renewed) magnesium anodes and fresh or filtered electrolyte in the fuel cell.

Figure 1:
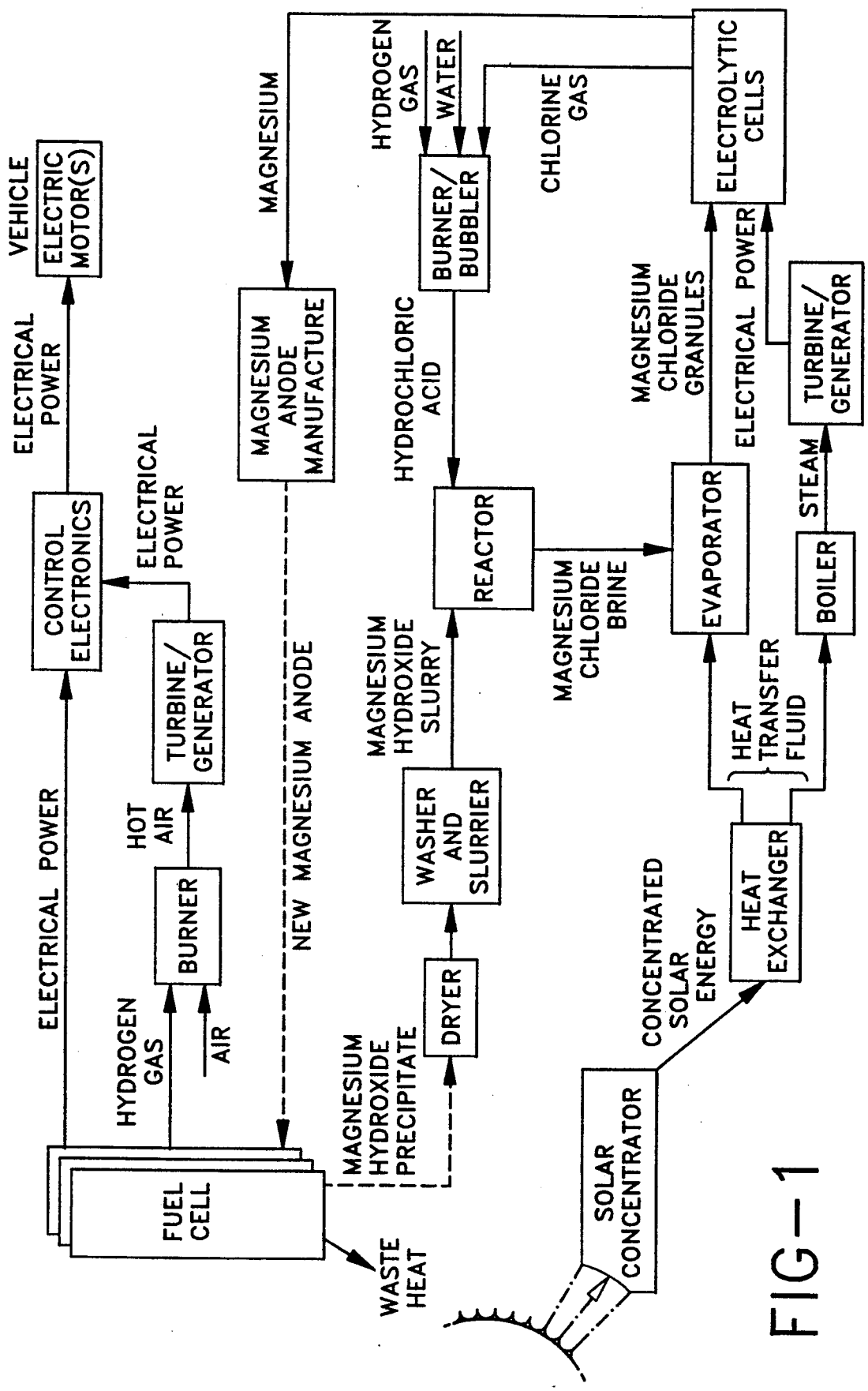
FIG. 1 is a diagram illustrating the functional interaction of the apparatus involved in generating hydrogen gas from fuel cells and then recycling and renewing the magnesium anode of these fuel cells.
Figure 2:
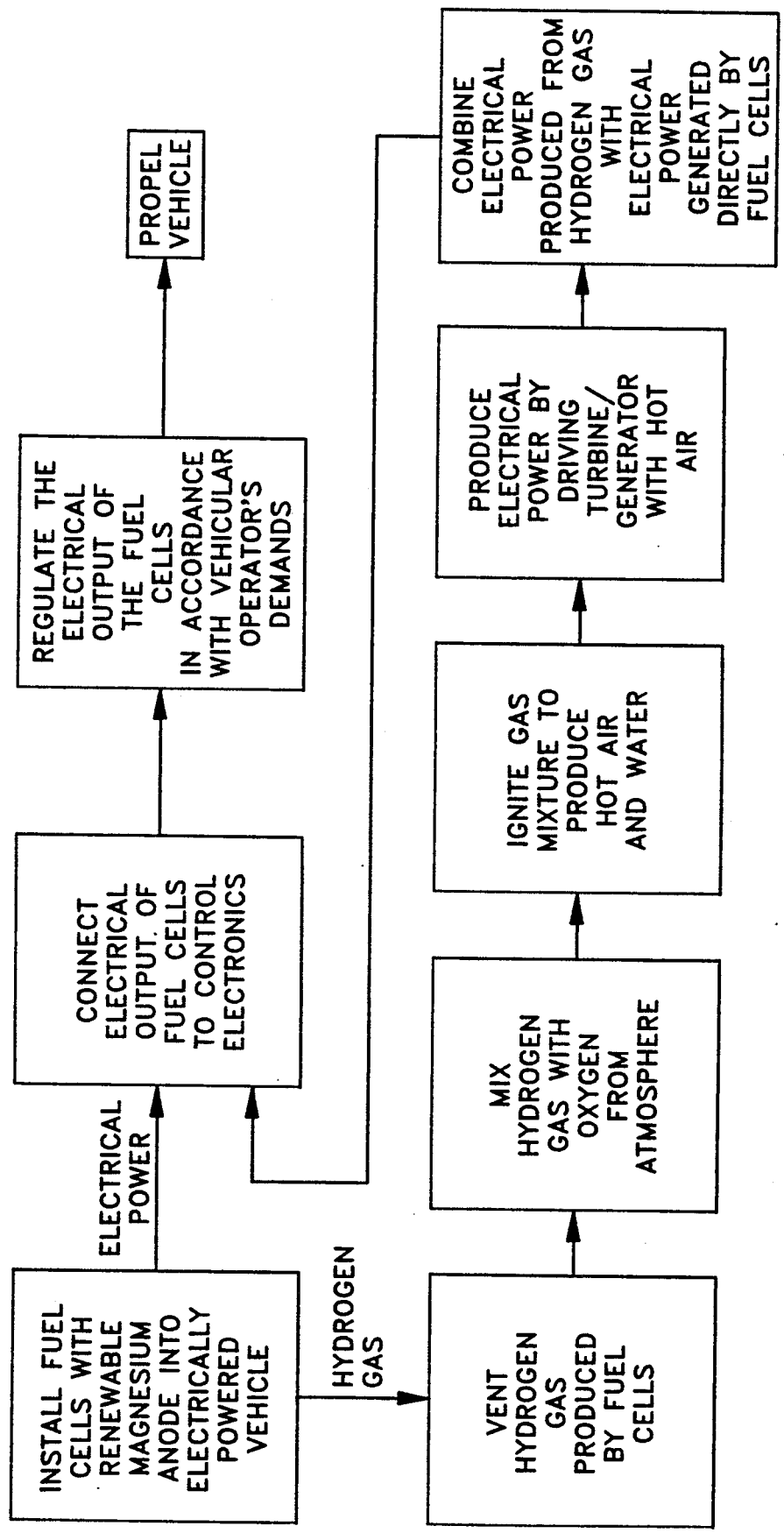
FIG. 2 is a process diagram illustrating the steps involved in generating hydrogen gas from fuel cells and using this hydrogen gas to produce electricity via a turbine/generator to propel an electric vehicle until the fuel cells no longer produce a usable volume of hydrogen gas.

First Stage—Depleting The Fuel Cell (Hydrogen Generator), FIG. 2

Step 1—Install Fuel Cells With Renewable Magnesium Anode Into A Vehicle

A plurality of fuel cells, the exact number being determined by the energy required to obtain the speed and range desired for a particular vehicle mass, is installed in an accessible location in a vehicle. In the preferred embodiment, a fuel cell (hydrogen generator) such as described in U.S. Pat. No. 3,892,653 to Pacheco, incorporated herein by reference, is used.

In this fuel cell, an active magnesium electrode and an inactive electrode is immersed in a salt-water electrolyte. The inactive electrode could be composed of stainless steel (which may be used as a container), carbon, or other conductible material that is non-reactive. The fuel cell is hermetically sealed except for a vent to a manifold to permit collecting the hydrogen gas. The volume of hydrogen gas generated by this fuel cell varies in accordance with the electrical resistance connected between the electrodes. As this resistance is decreased, the current flow through the fuel cell increases as does the rate of hydrogen gas production. The volume of hydrogen gas generated is proportional to the current flow.

The electrochemical reaction decomposes the magnesium electrode by forming magnesium hydroxide which is deposited in the bottom of the fuel cell. When the magnesium electrode is consumed, the fuel cell ceases to generate hydrogen gas.

Concurrent with the electrochemical activity is electrolysis that liberates hydrogen gas and oxygen gas. No significant amount of oxygen gas passes out of the fuel cell because the oxygen gas becomes involved in the electrochemical reaction and also forms hydrogen peroxide.

This fuel cell (hydrogen generator) incorporates: (1) the reaction of the active metal, magnesium, with water to produce hydrogen gas from water, (2) the differing electrical potential of two metals to produce an electrical current, and (3) the use of the electric current flowing through the fuel cell to produce hydrogen gas from water by electrolysis. The current producing reaction is:

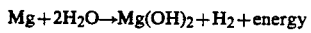

$$Mg + 2H_2O \rightarrow Mg(OH)_2 + H_2 + energy$$

The expected electrical potential using magnesium anodes is of the order of 1.4 volt versus the standard hydrogen electrode due to voltage losses across a protective magnesium hydroxide film that forms over the magnesium anode.

The use of alloying metals can make the potential somewhat more electropositive. Potentials in the 1.3 to 1.4 volt range can generally be expected when magnesium alloys are used.

Step 2—Regulate The Hydrogen Gas Production Of The Fuel Cells In Accordance With Vehicular Operator's Demands Control electronics means accept commands from the vehicular operator to speed up or slow down the vehicle. The control electronics means regulate the production of hydrogen gas by a plurality of fuel cells by increasing or decreasing the resistive loading on these fuel cells. A decrease in the resistive load results in more current and thus increases the production of hydrogen gas by the fuel cells. An increase in the resistive load results in less current and correspondively less hydrogen gas production by these fuel cells.

Step 3—Vent The Hydrogen Gas Produced By The Fuel Cells

As electrical current through the fuel cells varies, a proportional volume of hydrogen gas is produced. This hydrogen gas is vented to a common manifold means and piped to a burner or a combustion chamber means.

Figure 3:
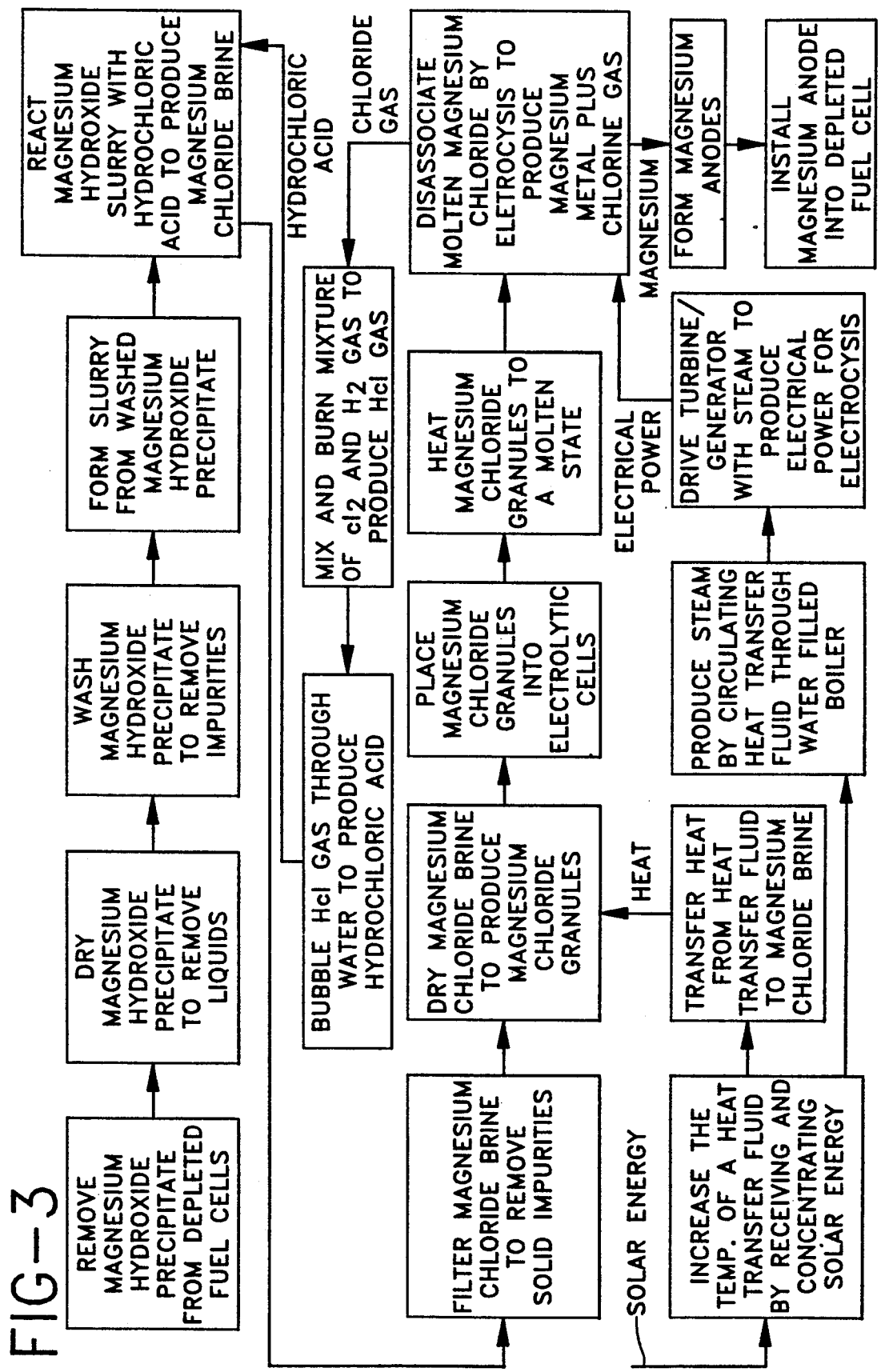
FIG. 3 is a process diagram illustrating the steps involved in generating hydrogen gas from fuel cells and using this hydrogen gas to operate a Sterling engine that mechanically propels a vehicle.

In another embodiment, FIG. 3, the hydrogen gas may be piped directly to a combustion engine means wherein the hydrogen gas is combined and burned with oxygen gas from the atmosphere. The engine means produces mechanical motive power that propels the vehicle by conventional power train linkage means.

The V160 Sterling Engine, as described in V160 Sterling Engine Program Update by Johansson, et al., SAE Technical Paper Series, 880542, International Congress and Exposition, Feb. 29–Mar. 4, 1988, incorporated herein by reference, is one example of an engine that is readily configured to operate from hydrogen gas. The V160 Stirling Engine is a two cylinder V-type engine comprising several modular subsystems: a drive system, a heating system, an air-fuel control system, a power control system, and an electronic engine control system. A working gas, typically helium, is sealed in a closed system that includes the pistons of the engine. By continuously heating and cooling this working gas, the gas passes through expansion and compression cycles and thus force the pistons to move.

The gas fuel heating system of the Sterling engine reflects the design of a common gas furnace. The air temperature of incoming air is increased to about 500° C. in a preheater. This preheated air flows into a combustor through a gas venturi and a combustor swirler. The air flow through the venturi is designed to induce a proportional flow of gaseous fuel, such as hydrogen, in order to obtain the proper air-fuel mixture. A torch ignitor ignites this air-fuel mixture. The hot gases produced by combustion, heat and expand the helium working fluid in the sealed system. This working fluid then drives the pistons of the drive system.

The air flow and air/fuel ratio are constantly adjusted by the air-fuel control system as it strives to maintain the helium working gas at a constant temperature. The drive system can be mechanically linked to a vehicle drive train to provide mechanical power to propel the vehicle. Alternatively, a generator can be directly connected to the Stirling Engine to produce electricity which can be used to charge storage batteries and to drive electric motors that propel the vehicle.

Step 4—Mix Hydrogen Gas With Oxygen From The Atmosphere, FIG. 2

Hydrogen gas produced by the fuel cells is mixed in appropriate portions with oxygen gas from the atmosphere in the burner means so as to produce a mixture that will burn, not explode.

Step 5—Ignite Gas Mixture To Produce Hot Air And Water

The mixture of hydrogen and oxygen gases are ignited and burned in the burner means. The reaction produces heat and non-polluting water which is discarded. The heat is applied to a heat exchanger means in the burner means in order to increase the temperature of atmospheric air and so produce hot air. Other fluids, either gaseous or liquid could also be heated and used to drive a turbine/generator set.

Step 6—Produce Electrical Power By Driving A Turbine/Generator With Hot Air

The hot air produced by the burner means is circulated through a conventional turbine means. This hot air drives the turbine which, in turn, drives a conventional electrical generator and thus produces electrical energy.

Step 7—Apply Electrical Power Produced From Hydrogen Gas To Electric Motors

Electrical energy produced by the turbine/generator is regulated by a control electronics means and applied to storage batteries and to electric motor means which provide the motive force to propel the vehicle. The process described continues until the magnesium anodes of the fuel cells (hydrogen generators) are depleted and the volume of hydrogen gas generated decreases to a point where the volume is insufficient to provide the energy needed to propel the vehicle.

Figure 4:
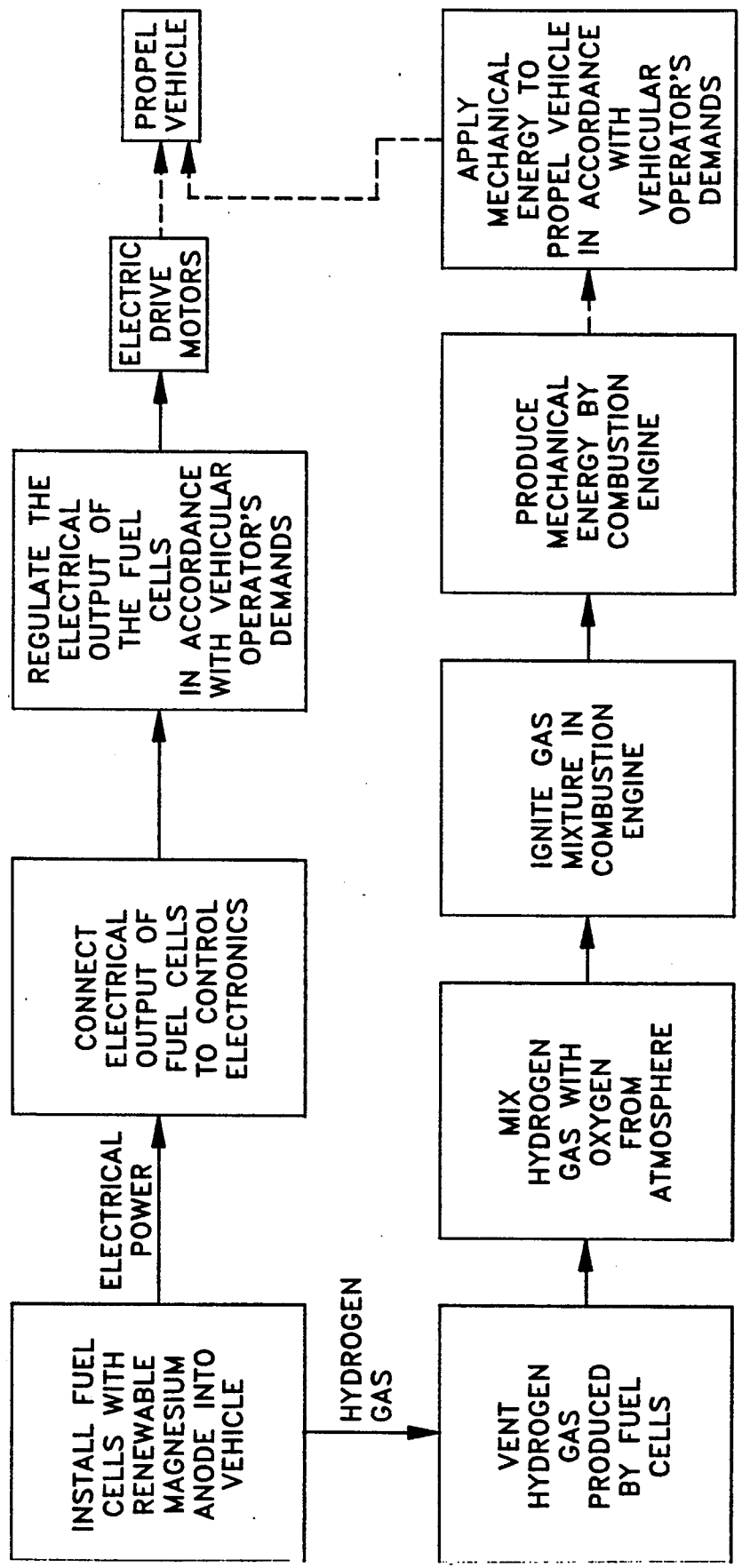
FIG. 4 is a process diagram illustrating the sequence of steps required to recycle magnesium hydroxide precipitate from depleted fuel cells (hydrogen gas generators) into new magnesium anodes.

Second Stage—Renewing The Magnesium Anodes To Re-Energize The Fuel Cells (Hydrogen Generators), FIG. 4

Step 8—Remove Magnesium Hydroxide Precipitate From Depleted Fuel Cells

The generation of hydrogen gas by the fuel cell is achieved by sacrificing the magnesium anode. As hydrogen gas is produced, the galvanic reaction depletes the magnesium anode and forms magnesium hydroxide precipitate. Once the portion of the magnesium anode in contact with the electrolytic solution is depleted, all hydrogen gas generation ceases.

Fuel cells (hydrogen generators) can be renewed and the magnesium hydroxide recycled to form new magnesium anodes. This is achieved by opening the fuel cell in a manner dictated by its design. For example, the entire top section with attached magnesium anodes can be unfastened and removed. Alternatively, the magnesium anodes could be designed to be unfastened and removed through the top of the fuel cell. Other removal means are readily available.

Having removed the top or the magnesium anodes from the fuel cell, the magnesium hydroxide and electrolytic bath can be removed, e.g., dumped out, poured out, or filtered and collected for recycling.

Step 9—Dry Magnesium Hydroxide Precipitate To Remove Liquids

The collected magnesium hydroxide precipitate is dried by any conventional drier means to remove the liquid content. The dried material comprises a magnesium hydroxide precipitate, salt from the electrolytic bath and impurities.

Step 10—Wash Magnesium Hydroxide Precipitate To Remove Impurities

The dried magnesium hydroxide precipitate is washed by conventional washer means. The wash water dissolves the salt left from the electrolytic bath and removes this salt plus any other water soluble impurities.

Step 11—Form Magnesium Hydroxide Slurry

After the magnesium hydroxide precipitate is washed, excess wash water is drained off until only a slurry of magnesium hydroxide precipitate remains.

Step 12—React Magnesium Hydroxide Slurry With Hydrochloric Acid To Produce Magnesium Chloride Brine The magnesium hydroxide slurry is then transported to a reactor wherein this slurry contacts and reacts with hydrochloric acid to form magnesium chloride brine plus heat:

$$Mg(OH)_2 + 2HCl \rightarrow MgCl_2 + 2H_2O + heat$$

STEP 13—Filter Magnesium Chloride Brine To Remove Solid Impurities

The magnesium chloride brine produced in the reactor is pumped through filtering means to remove solids and other impurities and transported to an evaporator means. Rotary or stationary filtering means, or the like, can be used.

STEP 14—Dry Magnesium Chloride Brine To Produce Magnesium Chloride Granules The purified magnesium chloride brine is transported to an evaporator means where the magnesium chloride brine is force dried by heat from solar energy means or from other energy sources. As an alternative, the brine can be spray dried. The magnesium chloride brine is placed in contact with heat exchanger means wherein solar heated fluid is circulated. The heat transferred from the fluid to the magnesium chloride brine evaporates the water. The dry magnesium chloride is typically in the form of 840–2,380 $\mu$m (8–20 mesh) granules.

STEP 15—Heat Magnesium Chloride Granules To Molten State

The dry magnesium chloride granules are typically placed in large holding tanks which are connected to and feed into a plurality of electrolytic cells. The granules could also be periodically loaded into electrolytic cells by manual or other automatic methods.

In addition to the magnesium chloride, sodium chloride and other salts are typically added to the electrolytic cells to lower the melting point of the magnesium chloride and to increase its conductivity.

As used in the DOW process, these electrolytic cells are large, rectangular, ceramic-lined pots with a capacity of about ten tons of molded magnesium chloride and salt. The internal parts of a cell form the cathode. A plurality of cylindrical graphite anodes are passed through a refractory top cover.

After the magnesium chloride granules and sodium chloride are loaded into the electrolytic cells, the cells are sealed, and the magnesium chloride is heated to about 710° C. which is sufficient to melt the magnesium chloride (melting point of 651° C.). Heat is provided by external heating means such as electrical resistance heating using electrical energy derived from solar energy means or from conventional furnace means. In addition, heat is also generated by the electrolysis current flowing through the molten magnesium chloride.

STEP 16—Disassociate Molten Magnesium Chloride By Electrolysis To Produce Magnesium Plus Chlorine Gas An electrical current produced from electrical power generated by solar energy means, or the like, is applied across the electrodes of the electrolytic cells. The molten magnesium chloride disassociates as follows:

$$MgCl_2 \rightarrow Mg + Cl_2$$

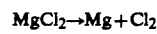

The electrolytic cells operate at about six volts and a current between 30,000–70,000 amperes with a current efficiency of about 80 percent. The electrical power requirements are 8 KW-HR per pound of magnesium produced.

Molten magnesium is liberated at the cathode and rises to the surface where it is directed by troughs to metal wells in the front of the cell. Typically, 99.9% pure magnesium is produced.

Hot chlorine gas is the other product of the electrolysis.

STEP 17—Form Magnesium Anodes

Periodically, the molten magnesium is removed by pumping means, or the like, from the wells at the front of the electrolytic cells. The magnesium is typically pumped into a crucible car which is then transported to a casting factory means. The magnesium is emptied into a holding furnace, alloying pots, or the like, and then pumped or poured into molding means. These molding means form the magnesium into the shape required for the magnesium anodes used to renew a depleted fuel cell.

STEP 18—Install Magnesium Anode Into Depleted Fuel Cell

The magnesium anodes, as produced by the recycling process or from newly mined magnesium, or the like, are installed in a plurality of depleted fuel cells along with an appropriate volume of new or filtered electrolytic solution. These renewed fuel cells are then sealed and reinstalled in the vehicle.

STEP 19—Burn Mixture Of Chlorine And Hydrogen Gas To Produce Hydrochloride Gas The chlorine gas produced by electrolysis in the electrolytic cells is drawn into regenerative furnace means, mixed with hydrogen gas, ignited and burned. The resulting product is hydrogen chloride gas.

STEP 20—Bubble Hydrogen Chloride Gas Throuqh Water To Produce Hydrochloric Acid The hot hydrogen chloride gas is transported by conventional means to a bubbler means wherein the hydrogen chloride ga is bubbled through water. The hydrogen chloride dissolves and disassociates in water to form hydrochloric acid which is recycled to the reactor of Step 12 wherein it reacts with the magnesium hydroxide slurry and forms magnesium chloride brine.

STEP 21—Increase The Temperature Of The Heat Transfer Fluid By Concentrating Solar Energy Solar energy is used to economically provide the large amounts of heat and electrical energy required to recycle magnesium hydroxide precipitate into magnesium anodes. Other energy sources could also be used either as a primary energy source or as supplemental energy sources.

Solar concentrator means are used that can generate temperatures greater than 212° F. in a heat transfer fluid means. In a preferred embodiment, mirrors of a solar concentrator lock onto the sun as it rises and follows the sun across the sky until it sets. These mirrors focus the energy from the sun onto a thin, black coated stainless steel pipe through which synthetic oil circulates. Typically, on a clear day, the solar energy collected heats this oil to about 735° F.

In another embodiment, a compound parabolic cusp reflector optically tracks the sun all day, all year long, without any moving parts. The geometry of the cusp reflector automatically concentrates the solar energy onto an energy collector tube as long as the sun is within ±70° from either side of the collector tube. Heat transfer fluid circulated through this collector tube can typically reach temperatures from 270° to 350° F.

In yet another embodiment, a compound parabolic concentrator means can be used in conjunction with a second stage non-imaging concentrator to attain a higher concentration ratio and thus higher temperatures in the heat transfer fluid. Typically, the primary element is a lens or a mirror, such as a Fresnel lens whose facets are arranged in a circle. In an alternative modification, a linear Fresnel lens could be used. A second stage concentrator is then moved in a circular arc so as to track the sun while the larger, primary mirror is fixed. The second stage concentrator receives the solar energy reflected by the Fresnel mirror and then concentrates this solar energy onto a cylindrical absorber-pipe through which a heat transfer fluid flows. Use of a second stage concentrator can heat the heat transfer fluid to the 200° to 600° F. range.

STEP 22—Transfer Heat From Heat Transfer Fluid To Magnesium Chloride Brine

The solar-heated transfer fluid is circulated through the evaporator means of Step 14 by conventional piping means. The heat energy derived from the transfer fluid dries the magnesium chloride brine to produce magnesium chloride granules. The heat transfer fluid is continuously recycled between the solar concentrator and the evaporator so that energy is constantly being transferred from the solar concentrator to the evaporator.

STEP 23—Drive Turbine/Generator To Produce Electrical Power For Electrolysis In one embodiment, the solar-heated transfer fluid is circulated through a water-filled boiler by conventional piping means. The high-temperature transfer fluid transforms the water in the boiler into steam. The steam produced by the solar-powered boiler is transferred by conventional piping means to a conventional turbine/generator set. The steam drives the turbine which in turn drives the generator.

In another embodiment, the solar-heated transfer fluid is circulated through a hydride-dehydride-hydrogen (HDH) system. In this system, a plurality of sealed, but interconnected, vessels contain a hydride material charged with hydrogen. Circulating the heated transfer fluid through these vessels increases the hydride temperature above the activation temperature, thereby releasing hydrogen gas. Since the hydrogen gas is released into a constant volume vessel, hydrogen gas at an elevated pressure and temperature is obtained. This hydrogen gas is connected by conventional piping means to a turbine wherein the hydrogen gas expands and drives the turbine which in turn drives a generator. The expanded hydrogen gas also concurrently cools. This lower pressure, cooled hydrogen gas is recirculated to a reactor to be reabsorbed by the hydriding material and to recommence the HDH cycle. By using a plurality of reactors, pressurized hydrogen gas can be discharged from one or more reactors while other reactors are recharging. This method renders a substantially continuous supply of pressurized hydrogen to drive a turbine.

The generator produces electrical power which is regulated and connected by conventional means to the electrolytic cells of Step 16. Thus, electrical power, produced from solar energy means, provides the electrical current needed to disassociate the magnesium chloride in the electrolytic cells.

It will be understood that various changes in the details, materials, and arrangements of parts which have been described and illustrated in order to explain the nature of the invention may be made by those skilled in the art within the principle and scope of the invention as expressed in the appended claims.

What I claim is:

1. A method of powering a vehicle with a plurality of renewable magnesium anode fuel cells (hydrogen gas generators), comprising the steps:

A. installing a plurality of renewable magnesium anode fuel cells in a vehicle,

B. regulating the hydrogen gas production of the fuel cells by control electronics means in accordance with vehicular operator's demands, C. venting and collecting hydrogen gas produced by the fuel cells, D. mixing the hydrogen gas with oxygen gas from the atmosphere to produce a gas mixture, E. igniting and burning the gas mixture to produce hot air and a non-polluting waste product, water, F. driving a turbine/generator means with the hot air so as to produce electrical power, G. powering the vehicle with the hydrogen gas derived from the fuel cells until no further useful volume of hydrogen gas is produced, H. renewing the depleted fuels cells by replacing the magnesium anode, removing the magnesium hydroxide precipitate formed by galvanic action, and replacing the electrolytic solution.

2. A method of powering an electric vehicle with a plurality of renewable magnesium anode fuel cells (hydrogen gas generators), comprising the steps:

A. installing a plurality of renewable magnesium anode fuel cells in an electric vehicle, B. regulating the hydrogen gas production of the fuel cells by control electronics means in response to commands of the vehicular operator, C. venting hydrogen gas produced by the fuel cells by manifold means to a burner means, D. mixing the hydrogen gas with oxygen gas from the atmosphere in the burner means to produce a gas mixture, E. igniting and burning the gas mixture to produce heat, F. increasing the temperature of atmospheric air by this heat to produce hot air, G. circulating the hot air through a turbine/generator means to produce electrical energy, H. applying the electrical energy produced to storage battery means and to electric drive motor means, I. consuming hydrogen gas derived from the fuel cells until the fuel cells are depleted, J. renewing the depleted fuel cells by adding a volume of electrolytic solution and new magnesium anodes.

3. A method of powering a vehicle with a plurality of renewable magnesium anode fuel cells (hydrogen gas generators), comprising the steps:

A. installing a plurality of renewable fuel cells in a vehicle,

B. regulating the hydrogen gas production of the fuel cells by control electronics means as commanded by an operator, C. venting and collecting hydrogen gas produced by the fuel cells, D. mixing the hydrogen gas with oxygen gas from the atmosphere and igniting this gas mixture in an engine means, E. producing mechanical energy by the engine means, F. using the mechanical energy to provide motive power to propel the vehicle, G. powering vehicle with the hydrogen gas derived from the fuel cells until no further usable volume of hydrogen gas is produced, H. renewing the fuel cells by replacing the magnesium anode and electrolytic solution and removing the magnesium hydroxide precipitate formed by galvanic action.

4. A method of powering a vehicle with a plurality of renewable fuel cells (hydrogen gas generators), the method comprising:

A. installing a plurality of renewable fuel cells in a vehicle,

B. regulating the hydrogen gas production of the fuel cells by control electronics means as commanded by the vehicular operator, C. venting the hydrogen gas produced by the fuel cells to a hydrogen powered combustion engine, D. mixing the hydrogen gas with oxygen gas from the atmosphere and igniting the gas mixture in the combustion engine to produce mechanical energy, E. applying the mechanical energy to the motive power means of the vehicle, and thus propelling the vehicle, F. consuming hydrogen gas produced by the fuel cells until the fuel cells are depleted, G. removing the depleted magnesium anodes, magnesium hydroxide precipitate and electrolytic solution from the depleted fuel cells, H. renewing the depleted fuel cells by adding a volume of fresh electrolytic solution and new magnesium anodes.

5. A method of powering a vehicle with a plurality of renewable magnesium anode fuel cells (hydrogen gas generators), comprising the steps:

A. installing a plurality of fuel cells with magnesium anodes in an electrically powered vehicle, B. regulating the hydrogen gas production of the fuel cells by control electronics means as demanded by the operator, C. venting the hydrogen gas produced by the fuel cells to a hydrogen powered combustion engine, D. mixing the hydrogen gas with oxygen gas from the atmosphere and igniting the gas mixture in the combustion engine to produce mechanical energy, E. applying the mechanical energy to drive a generator and thus produce electrical energy, F. applying the electrical energy produced to storage battery means and to electric drive motor means, G. propelling the vehicle using the electrically powered drive motor means, H. consuming hydrogen gas derived from the fuel cells until the fuel cells are depleted, I. removing the depleted magnesium anodes, magnesium hydroxide precipitate and electrolytic solution from the depleted fuel cells, J. renewing the depleted fuel cells by adding a volume of fresh electrolytic solution and new magnesium anodes.

6. A method of powering a vehicle with a plurality of renewable magnesium anode fuel cells (hydrogen gas generators), comprising the steps:

A. installing a plurality of renewable magnesium anode fuel cells in a vehicle,

B. regulating the hydrogen gas production of the fuel cells by control electronics means in accordance with vehicular operator's demands, C. burning the hydrogen gas to produce hot air and a non-polluting waste product, water, D. driving a turbine/generator means with the hot air so as to produce electrical power, E. powering the vehicle with the hydrogen gas derived from the fuel cells until no further useful volume of hydrogen gas is produced, F. renewing the depleted fuel cells by replacing the magnesium anode, removing the magnesium hydroxide precipitate formed by galvanic action, and replacing the electrolytic solution.

7. A method of powering an electric vehicle with a plurality of renewable magnesium anode fuel cells (hydrogen gas generators), comprising the steps:
   A. installing a plurality of renewable magnesium anode fuel cells in an electric vehicle,
   B. regulating the hydrogen gas production of the fuel cells by control electronics means in response to commands of the vehicular operator,
   C. burning the hydrogen gas to produce heat,
   D. increasing the temperature of atmospheric air by this heat to produce hot air,
   E. circulating the hot air through a turbine/generator means to produce electrical energy,
   F. applying the electrical energy produced to storage battery means and to electric drive motor means,
   G. consuming hydrogen gas derived from the fuel cells until the fuel cells are depleted,
   H. renewing the depleted fuel cells by adding a volume of electrolytic solution and new magnesium anodes.

8. A method of powering an electric vehicle with a plurality of renewable magnesium anode fuel cells (hydrogen gas generators), comprising the steps:
   A. installing a plurality of renewable magnesium anode fuel cells in an electric vehicle,
   B. regulating the hydrogen gas production of the fuel cells by control electronics means in response to commands of the vehicular operator,
   C. burning the hydrogen gas to produce heat,
   D. increasing the temperature of atmospheric air by this heat to produce hot air,
   E. circulating the hot air through a turbine/generator means to produce electrical energy,
   F. applying the electrical energy produced to storage battery means and to electric drive motor means,
   G. consuming hydrogen gas derived from the fuel cells until the fuel cells are depleted,
   H. renewing the depleted fuel cells by adding a volume of electrolytic solution and new magnesium anodes, wherein the magnesium anode is produced from a previously depleted magnesium anode by the steps of:
      A. removing a magnesium hydroxide precipitate from the fuel cell,
      B. reacting the magnesium hydroxide precipitate with hydrochloric acid to form magnesium chloride,
      C. heating the magnesium chloride to a molten state, so as to produce molten magnesium chloride,
      D. disassociating the molten magnesium chloride by electrolysis to produce magnesium metal in a highly pure form and chloride gas,
      E. forming the magnesium metal into fuel cell anodes,
      F. installing these anodes in depleted fuel cells so as to re-energize the depleted fuel cells.

* * * * *